May 29, 1934.  H. F. TAYLOR  1,960,517
STEAK FORMING MACHINE
Filed Feb. 1, 1930  4 Sheets-Sheet 1
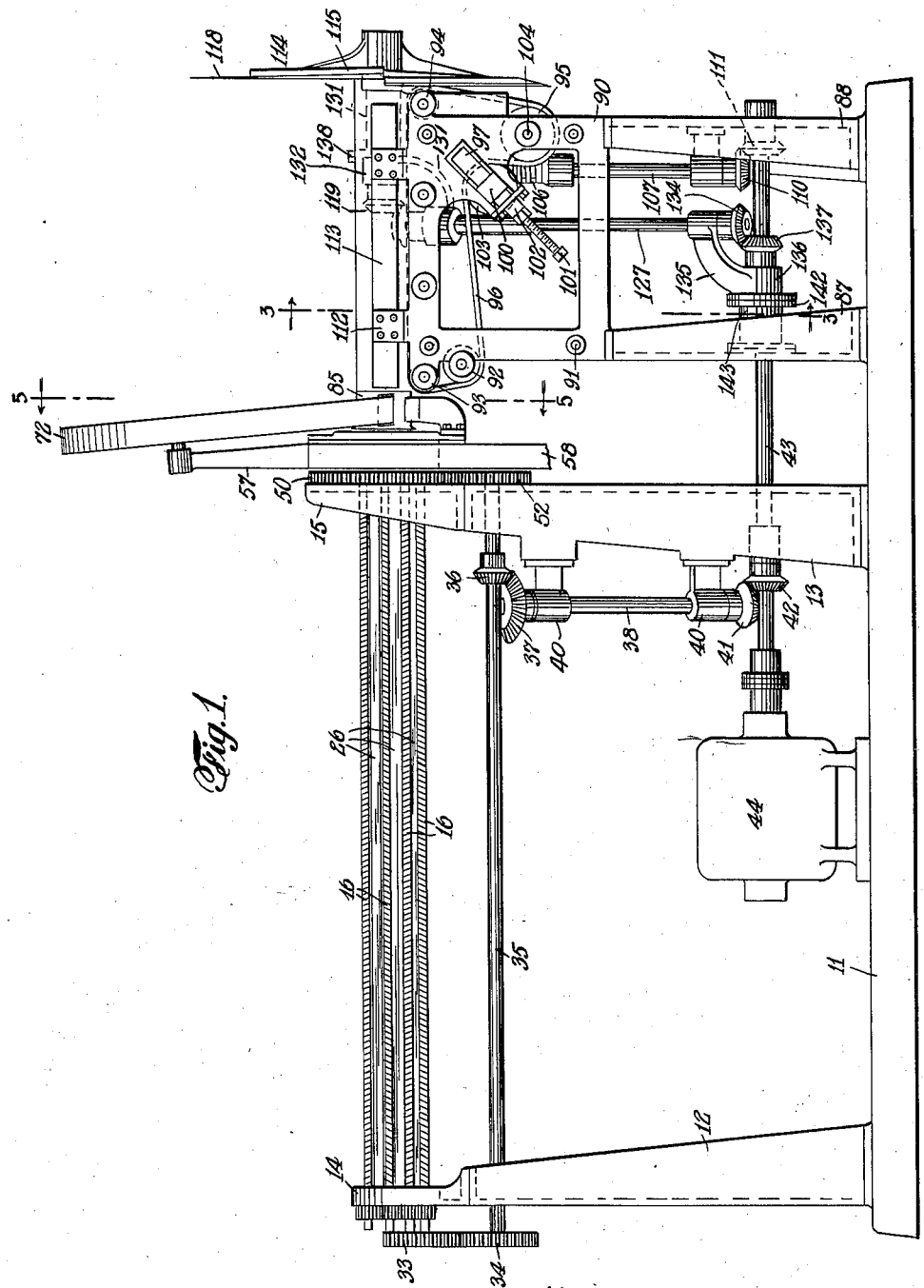

May 29, 1934.  H. F. TAYLOR  1,960,517
STEAK FORMING MACHINE
Filed Feb. 1, 1930  4 Sheets-Sheet 2
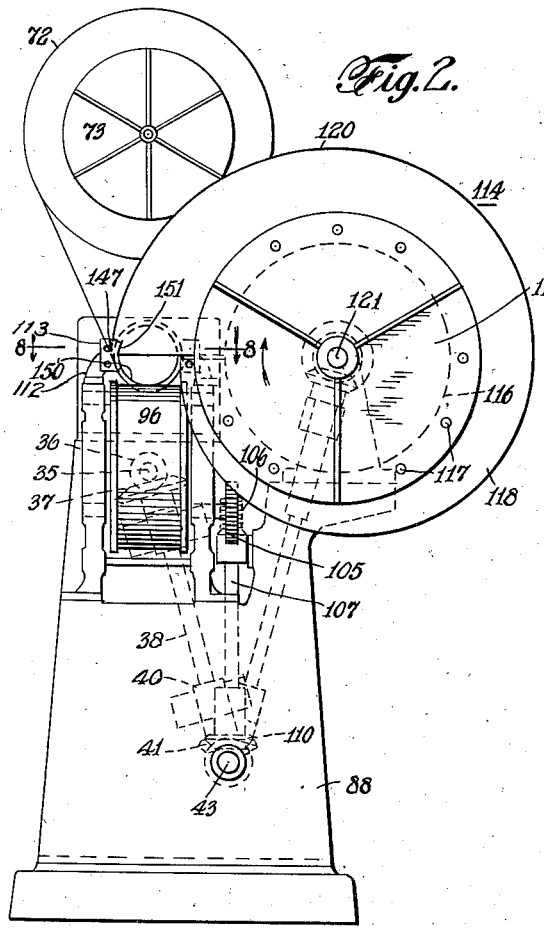
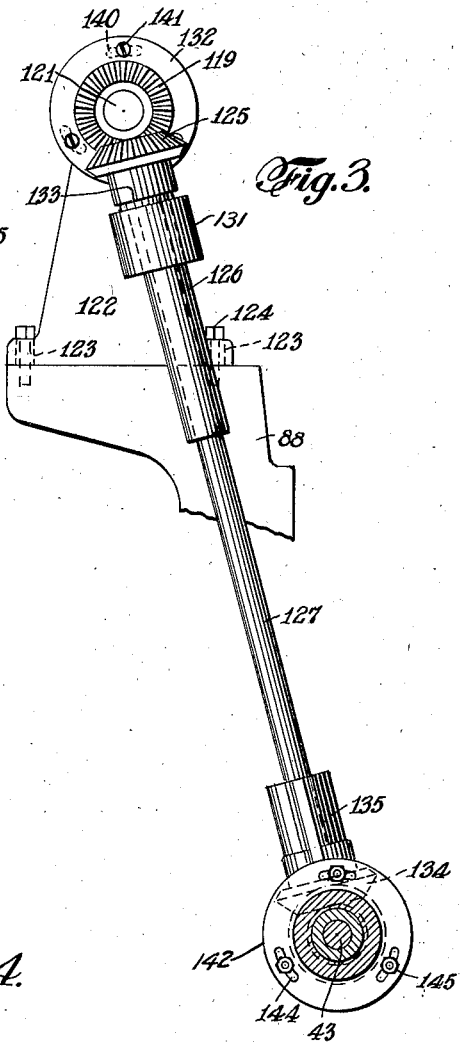
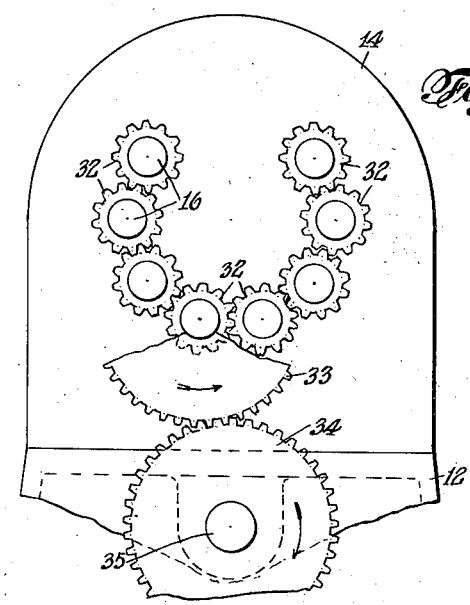
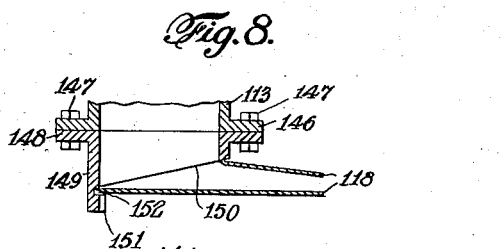

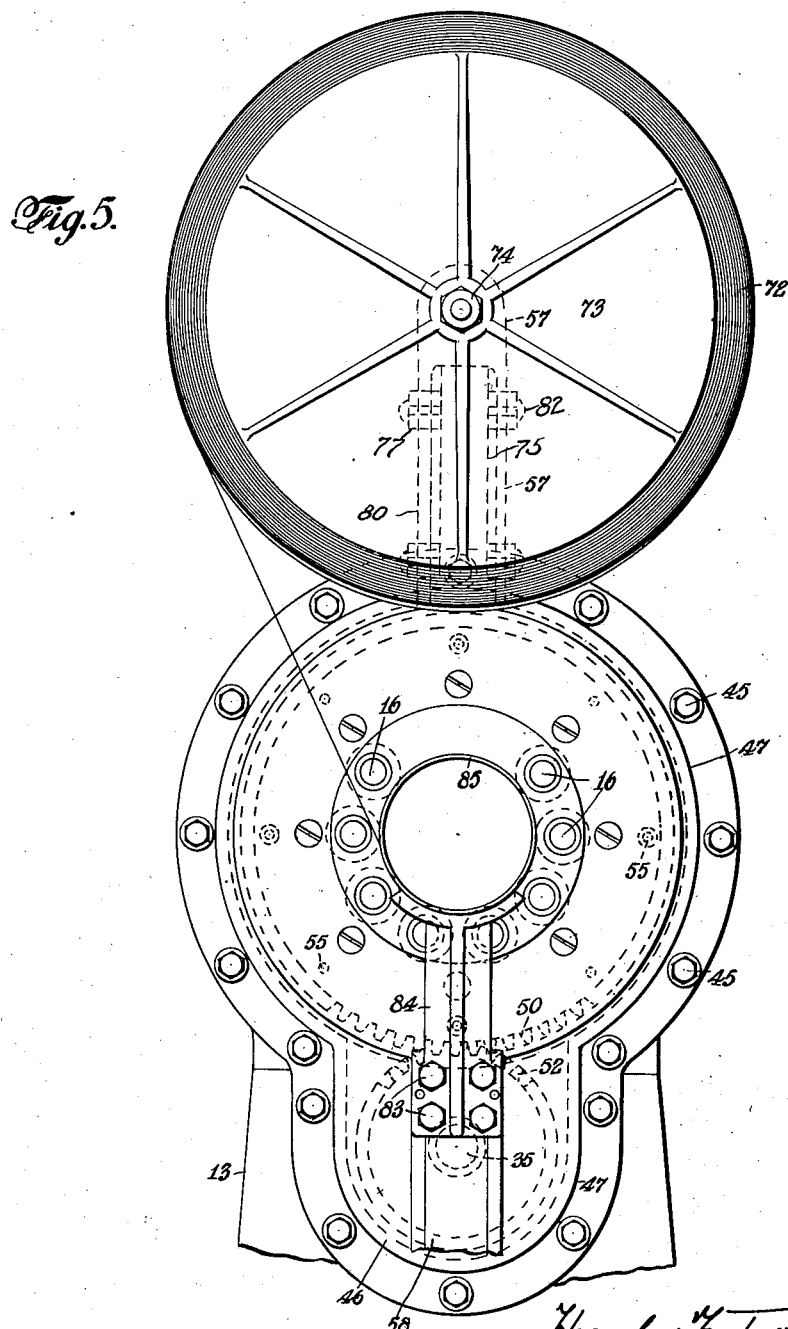

May 29, 1934.  H. F. TAYLOR  1,960,517
STEAK FORMING MACHINE
Filed Feb. 1, 1930  4 Sheets-Sheet 4
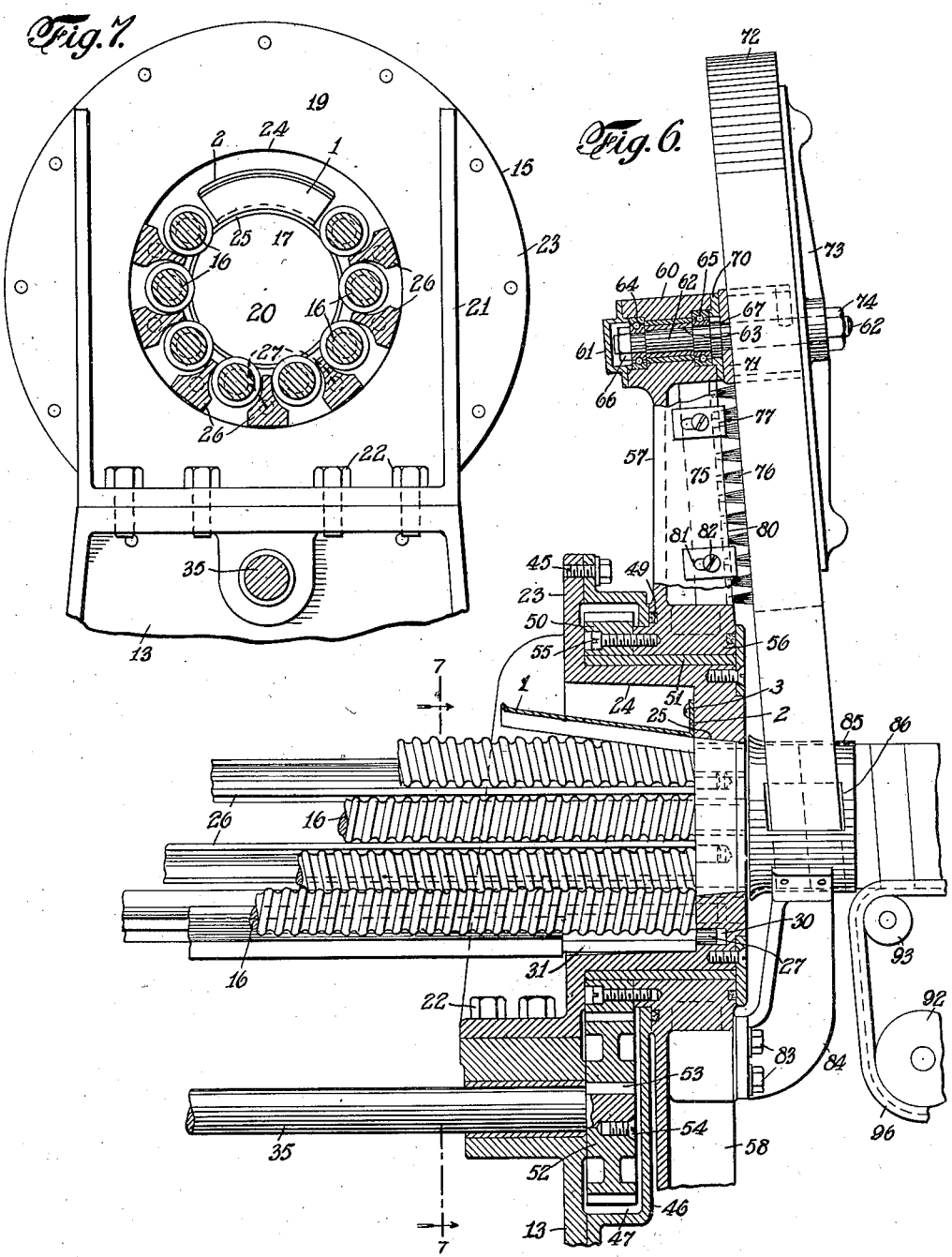
Harden F. Taylor, INVENTOR
BY Wm. S. Pritchard, ATTORNEY Patented May 29, 1934

1,960,517

UNITED STATES PATENT OFFICE 1,960,517

STEAK FORMING MACHINE

Harden F. Taylor, Scarsdale, N. Y., assignor to The Atlantic Coast Fisheries Company, New York, N. Y., a corporation of Maine Application February 1, 1930, Serial No. 425,146

18 Claims. (Cl. 17—1)

This invention relates to the art of treating comestibles and more particularly to a machine for making steaks.

The present invention contemplates one form of an apparatus for carrying out the process described in copending application Serial No. 375,165, which has matured into Patent Number 1,864,284, granted June 21, 1932.

The invention accordingly provides an apparatus which is adapted to pack flesh such as fish fillets into a substantially solid mass, bind them into a roll and slice them into predetermined sizes.

According to a concrete exemplification of the present invention, means is provided for feeding soft, yieldable comestibles, for example, flesh such as fish fillets, along a trough. This means also functions to pack these fillets into a substantially compact mass. This mass is wrapped around the surface thereof with helically arranged ribbon strips so as to form a compact roll. This roll is advanced into the field of action of a slicer which cuts the wrapped roll into slabs of predetermined thicknesses. These slabs can then be frozen, or otherwise treated, and marketed.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which:

Figure 1 is a side elevation of the assembled device;

Figure 2 is a front elevation of the same;

Figure 3 is a section taken on line 3—3 of Figure 1;

Figure 4 is a view showing details of the driving means associated with the trough;

Figure 5 is a section taken on line 5—5 of Figure 1;

Figure 6 is a section showing details of the paper roll mounting and associated feeding mechanism;

Figure 7 is a section taken on line 7—7 of Figure 6;

Figure 8 is a section taken on line 8—8 of Figure 2.

Like reference characters denote like parts in the several figures of the drawings.

In the following description and in the claims, parts will be identified by specific names for convenience, but they are intended to be as generic in their application to similar parts as the art will permit.

Referring more particularly to the accompanying drawings, there is shown a base 11 having mounted thereon pedestals 12 and 13. These pedestals are surmounted by brackets 14 and 15 respectively. Extending between these brackets 14 and 15 are a plurality of screw members 16, terminating on both ends thereof in cylindrical portions which are suitably journaled in these brackets.

These screw members 16 are circularly arranged, as indicated in Figure 7, and spaced on top so as to provide an opening 17 which serves as a means of access to the interior of a trough 20, conjointly defined by said screw members 16. The threaded portion of the screw members may be made of a form similar to a knuckle screw having the roots and tops of the threads thereof substantially rounded. It should be noted from Figure 6 that these screw members 16 are arranged so that the direction of their threads is alternately right and left handed so that each screw member will have disposed adjacent thereto a screw member having oppositely directed threads. The purpose of this will soon be apparent.

The bracket 15 comprises a U-shaped member 21 secured to the pedestal 13 by means of bolts 22, and having integral therewith a member 19. This member 19 is provided with a flange 23, a hollow 24, and an aperture 25. The aperture 25 is substantially coextensive in area with the cross-section of the trough 20 and is aligned therewith, as shown in Figure 6.

For the purpose of obviating the extrusion of comestibles between the screw members 16, there are mounted therebetween longitudinal fillers 26 having a cross-section, as indicated in Figure 7. The ends of these fillers have pins 27 projecting therefrom which are received in corresponding bores 30 in the brackets 14 and 15 (Figure 6).

The hollow 24 tapers towards the right, as viewed in Figure 6, and the right hand ends of the fillers 26 have reduced portions 31 adapted to be embraced by the surface of said hollow. This arrangement provides facile means for assembling the parts as shown.

The screw members 16 have secured at one end thereof pinions 32 which mutually intermesh, as shown in Figure 4. One of the screw members 16 has also secured thereto a spur gear 33, which meshes with a spur gear 34. This spur gear is mounted on a shaft 35 which is journaled in suitable bearings in the pedestals 12 and 13. This shaft 35 carries proximate one end thereof a bevel gear 36 which meshes with a bevel gear 37 secured to one end of a shaft 38 (Figure 1). This shaft 38 is held by bearing members 40 extending transversely of the pedestal 13. The other end of the shaft 38 has fixed thereto a second bevel gear 41 which meshes with a bevel gear 42 mounted on a suitably journaled drive shaft 43. This shaft 43 is driven by a source of power which may take the form of an electric motor 44, mounted on the base 11. It should be noted that through the agency of this arrangement each adjacent screw member 16 would be rotated in opposite directions in response to the actuation of the motor 44. However, as already set forth, adjacent screw members 16 have oppositely directed threads so that the influence of these members is to conjointly urge towards the right (as viewed in Figure 1) any object placed in the trough 20.

Disposed in the hollow 24 over the opening 17 of the trough 20 is an arcuated plate 1 which is provided with a flange 2 and which is secured to the member 19 by means of screws 3. This plate 1 serves to maintain the comestibles within the trough 20 prior to the passage of said comestibles through the aperture 25.

Secured to the flange 23, by means of bolts 45, is a member 46 which forms a housing 47 for the reception therein of a ring gear 50, as shown in Figures 5 and 6. This member 26 is removed from the apparatus as shown in Figure 1 in order that the position of the ring gear 50 with reference to the other parts of the apparatus may be clearly shown. This ring gear 50 is rotatably mounted about a sleeve bearing 51, which is fitted on to the member 19. This ring gear 50 is driven by a pinion 52 which intermeshes therewith, and which is fixedly mountd on the end of the shaft 35 by means of a key 53 and a flathead screw 54.

Secured to the ring gear 50 by means of bolts 55 is a sleeve member 56. Interposed between the member 46 and the sleeve 56 is an annular absorbent ring 49 which serves to retain lubricants within the housing 47. The sleeve member 56 has radially extending therefrom a channel arm 57 and a counterbalance arm 58. This counterbalance arm 58 is provided at the free end thereof with suitable weights (not shown). These weights may be adjusted so as to attain any selected amount of leverage with respect to the center of the sleeve member 56.

The free end of the channel arm 57 is provided with a bearing block 60, one end thereof being closed by a cap 61. Mounted in said bearing block 60 is a shaft 62 which is mounted for rotational movement therein through the agency of a bearing sleeve 63 and ball-bearing arrangements 64 and 65. The longitudinal movement of the shaft 62 is obviated by means of a collar 66 pinned on one end of the shaft 62 and cooperating with the races of the ball-bearing arrangement 64, and a shoulder 67 formed by an abrupt enlargement of the shaft 62 and cooperating with the races of the other ball-bearing arrangement 65.

The shaft 62 is embraced by a disc 70 which cooperates with a hub member 71 and which holds the ball-bearing arrangement 65 in place. Fixedly mounted on said hub 71 is a paper ribbon roll 72 which is held in place by means of a spider arrangement 73 (Figures 5 and 6). This spider arrangement is held in place by a nut 74 having a threaded engagement with the end of the shaft 62.

Centrally disposed in the channel arm 57 is a brush holder 75. The brush holder is provided with bristles 76 which impinge on the plane side surface of the paper roll 72. This brush assembly constitutes a tensioning device for the paper roll 72 and its function will be more specifically set forth hereinafter. Connected to the brush holder 75 are members 77 having channel edges which embrace the edges 80 of the channel arm 57 and which are provided with elongated slots 81. These slots cooperate with screws 82 having a threaded engagement with the channel arm 57 so that the brush holder 75 can be adjusted to obtain any selective degree of contact between the bristles 76 and the paper roll 72. This feature also serves to compensate for the wearing of the bristles 76, as will be more apparent hereinafter.

Secured to the counterbalance arm 58 by means of bolts 83 is a bracket 84 (Figures 5 and 6). Mounted on said bracket is a sleeve 85 which is axially aligned with the aperture 25. One end of this sleeve is flared, as shown in Figure 6, for the purpose of facilitating the passage of comestibles therethrough. This sleeve 85 is provided with a slit 86 for the passage therethrough of the paper ribbon.

Mounted also on the base 11 are pedestals 87 and 88 which are surmounted by members 90 constituting the frame piece of a conveying system. These members 90 are held together by means of tie-rods 91 and have journaled thereon rollers 92, 93, 94 and 95. An endless belt 96 is provided, which is wound around these rollers, as shown in Figure 1. The members 90 are provided with channels 97 in which are slidably mounted blocks 100. These blocks 100 can be adjusted to any selected position along the channels 97 in response to the manipulation of screws 101, which are connected to the blocks 100 and which have threaded engagements with members 102. This selective adjustment is in turn imparted to a tension roller 103, which is rotatably mounted on the blocks 100.

The roller 95 constitutes a driving means for the conveying arrangement 89 and is mounted upon a shaft 104. This shaft has also secured thereto a worm wheel 105 which meshes with a worm 106 secured at one end of a suitably journaled shaft 107. The other end of this shaft 107 carries a bevel gear 110 which meshes with a bevel gear 111 mounted on the main driving shaft 43.

Vertically extending from the members 90 are brackets 112, which have secured thereto guide strips 113 (Figures 1 and 2). These strips are adapted to guide therebetween the comestibles extruded from the sleeve 85.

Mounted adjacent the end of the machine is a slicing arrangement designated generally by the numeral 114. This arrangement comprises a support 115, the face of which follows substantially the path of the helix and is provided with a marginal ledge 116 which consequently also follows substantially the path of a helix. Secured to this ledge 116 by means of screws 117 is a knife 118, the cutting edge 120 of which is arranged in the form of a spiral. This knife is sprung into the position adjacent the face of the support 115 and around the ledge 116, so that the cutting edge 120 of said knife substantially follows the course generated by a point rotating about the axis of a cone and simultaneously moving along the surface of said cone towards its apex.

The guide strips 113 are provided at one end thereof with flanges 146 which cooperate through the instrumentality of bolts 147 with flanges 148 of a cylindrical ring support 149, as shown in Figures 2 and 8. This ring support 149, which has not been shown in Figure 1 for the sake of simplicity, has its edge 150 cut at an angle, as shown in Figure 8, and is provided with an apron 151 and a groove 152. The ring support 149 is so arranged with respect to the slicing arrangement 114 and so cooperates therewith that the knife edge 120 in the last stages of its cutting action enters the groove 152. During this operation the comestibles are being laterally supported against the action of the knife 118 by the left hand portion of the ring support 149, as illustrated in Figure 2. In this manner a clean-cut severance of the wrapped comestibles is effected.

The knife support 115 is fixedly mounted on a shaft 121 which is journaled in a bearing bracket 122 having two bearings (not shown), Figures 1, 2 and 3. This bracket 122 is mounted on the pedestal 88 and the base thereof is provided with elongated slots 123 which have passing therethrough bolts 124. These bolts are screwed on to the pedestal 88 and provide means conjointly with the slots 123 for shifting the bracket 122 in any selective position with respect to the axis of the sleeve member 85. The knife 118 is rotated through the instrumentality of a bevel gear 119 mounted on the end of the shaft 121. This bevel gear 119 meshes with a second bevel gear 125 which is carried at the end of a sleeve 126 having telescopically mounted therein a floating shaft 127. This sleeve 126 is journaled to one end of a bearing bracket 131, the other end of which is connected to a flanged sleeve 132 loosely mounted on the shaft 121. This bearing bracket 131 acts as a support for a hub 133 connected to the bevel gear 125.

The rotating movement of the shaft 121 is imparted to it by the shaft 127 through the interposition of a feather (not shown), between said shaft 127 and the sleeve 126. However, the shaft 127 is free to slide in the sleeve 126 for the purpose hereinafter referred to. The lower end of the shaft 127 has secured thereto a bevel gear 134 positioned adjacent one end of a bearing bracket 135, the other end of which is connected to a flanged sleeve 136 loosely mounted with respect to the main driving shaft 43. This bevel gear 134 meshes with a bevel gear 137 mounted on the shaft 43.

It should be noted that the angular position of the floating shaft 127 depends on the position of the bracket 122. Adjusting features have been provided in order to accommodate the position of the shaft 127 in accordance with the selected position of the bracket 122 so as to maintain the bevel gears 125 and 134 in mesh with their cooperating gears 119 and 137 respectively. This adjusting feature is effected through the agency of a flanged member 138 which is loosely mounted with respect to the shaft 121 and which is provided with segmental slots 140. Guided in said slots are bolts 141 which have a threaded engagement with the flanged sleeve 132. The main shaft 43 is similarly provided with a flanged member 142 connected to a bearing 143. The flanged member 142 is provided with segmental slots 144 which cooperate with bolts 145 threaded on to the flanged sleeve 136. By this arrangement the angular position of the floating shaft can be adjusted to any selected position corresponding to the position of the bracket 122.

In the operation of the machine, soft yieldable comestibles, such as fish fillets, are placed in the trough 20 proximate the left hand end thereof, as viewed in Figure 1. These fillets will be advanced towards the right through the operation of the screw members 16, as already described. This operation also effects the packing of these fillets so that as they are extruded from the aperture 25 they are in substantially compact form. The sleeve member 56, through the cooperation of its attached ring gear 50 with the pinion 52, rotates about the member 19. This results in the rotation of the paper roll 72 about the member 19, as well as the rotation of the sleeve 85. As a mass of fish fillets is fed through the sleeve 85 the paper ribbon is unreeled from the paper roll 72 and wrapped about the mass of fillets so as to form a more compressed fillet roll. It should be noted that this fillet roll is wrapped in the course of its movement so that the ribbon strips will be helically arranged about said roll. Under these conditions it is necessary to feed these ribbon strips at a particular angle with respect to the fillet roll in order to effect an equally distributed compression of said roll when wrapped. For this purpose, the shaft 62 has been angularly disposed a necessary amount with respect to the horizontal in order to effect a corresponding angular tilting of the roll 72.

As the ribbon roll 72 becomes smaller, the leverage arm of the ribbon strip with respect to the center of the shaft 62 becomes correspondingly smaller, and a corresponding larger force is required to unreel the ribbon roll 72. This decrease in the leverage arm is compensated by reducing the resistance due to the action of the bristles 76 on the plane side surface of the paper roll. This is automatically effected as the result of the arrangement of said bristles on said surface. As the diameter of the ribbon roll becomes smaller, the number of bristles cooperating with said ribbon roll becomes correspondingly lessened so that a substantially constant tension is maintained in the ribbon strips.

As a mass of fillets is wrapped into a roll, it is advanced on to the conveying belt 96 which carries it into the field of action of the blade 118. This blade rotates in a clockwise direction as seen in Figure 2 and is so constructed that, as the fillet roll is advanced, the cutting edge 120 of the blade contacting with the roll progressively travels with the initial incision of said roll so that a plane cut is thereby effected. The slabs of fillets can then be subsequently frozen and marketed.

In case the cutting edge 120 of the blade 118 is sharpened, the resulting reduction in size of the blade can be compensated for by adjusting the position of the bracket 122 along the pedestal 88 by means of the guide slots 123 and bolts 124. The corresponding angular position of the floating shaft 127 can be correspondingly adjusted, as already described.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

I claim:

1. An apparatus for continuously making steaks comprising in combination, successively and cooperatively arranged means to form a plurality of pieces of flesh into a substantially compact mass and feed the mass in position for binding, means to bind said mass, means to feed the bound mass into the zone of action of a cutting mechanism, and means to transversely cut the bound mass into discs of substantially uniform size.

2. An apparatus for continuously making steaks comprising in combination successively and cooperatively arranged means to form a plurality of pieces of flesh into a substantially compact mass and simultaneously feed the mass in position for binding, means to helically wind a ribbon around said mass, means to feed the bound mass into the zone of action of a cutting mechanism, and means to transversely cut the wound mass into discs of substantially uniform size.

3. An apparatus for continuously making steaks comprising in combination a plurality of screw members arranged to define a trough and form a plurality of pieces of flesh into a substantially compact mass and simultaneously feed the mass in position for binding, means to bind said mass means to feed the bound mass into the zone of action of a cutting mechanism, and means to transversely cut the bound mass into discs of substantially uniform size.

4. An apparatus for continuously making steaks comprising in combination a plurality of screw members arranged to define a trough and form a plurality of pieces of flesh into a substantially compact mass and simultaneously feed the mass in position for binding, means to helically wind a ribbon around said mass, means to feed the bound mass into the zone of action of a cutting mechanism, and means to transversely cut the wound mass into discs of substantially uniform size.

5. An apparatus for continuously making steaks comprising in combination a plurality of screw members arranged to define a trough and form a plurality of pieces of flesh into a substantially compact mass and simultaneously feed the mass in position for binding, the adjacent screw members having oppositely directed threads, means to rotate the adjacent screw members in opposite directions, means to bind said mass, means to feed the bound mass into the zone of action of a cutting mechanism, and means to transversely cut the bound mass into discs of substantially uniform size.

6. An apparatus for continuously making steaks comprising in combination a plurality of screw members arranged to define a trough and form a plurality of pieces of flesh into a substantially compact mass and simultaneously feed the mass in position for binding, the adjacent screw members having oppositely directed threads, means to rotate the adjacent screw members in opposite directions, means to helically wind a ribbon around said mass, means to feed the bound mass into the zone of action of a cutting mechanism, and means to transversely cut the wound mass into discs of substantially uniform size.

7. An apparatus for continuously making steaks comprising in combination successively and cooperatively arranged means to form a plurality of pieces of flesh in a substantially compact mass and simultaneously feed the mass in position for binding, a holder for carrying a roll of ribbon to be wound around the mass, means for effecting relative movement between the mass and roll of ribbon, whereby the ribbon is helically wound around the mass, means to feed the bound mass into the zone of action of a cutting mechanism, and means to transversely cut the helically wound mass into discs of substantially uniform size.

8. An apparatus for continuously making steaks comprising in combination successively and cooperatively arranged means to form a plurality of pieces of flesh in a substantially compact mass and simultaneously feed the mass in position for binding, a holder for carrying a roll of ribbon to be wound around the mass, means for rotating said holder and roll of ribbon around the mass, whereby the ribbon is helically wound around the mass, means to feed the bound mass into the zone of action of a cutting mechanism, and means to transversely cut the helically wound mass into discs of substantially uniform size.

9. An apparatus for continuously making steaks comprising in combination a plurality of screw members arranged to define a trough and form a plurality of pieces of flesh into a substantially compact mass and simultaneously feed the mass in position for binding, a holder for carrying a roll of ribbon to be wound around the mass, means for rotating said holder and roll of ribbon around the mass, whereby the ribbon is helically wound around the mass, means to feed the bound mass into the zone of action of a cutting mechanism, and means to transversely cut the wound mass into discs of substantially uniform size.

10. An apparatus for continuously making steaks comprising in combination a plurality of screw members arranged to define a trough and form a plurality of pieces of flesh into a substantially compact mass and simultaneously feed the mass in position for binding, the adjacent screw members having oppositely directed threads, means to rotate the adjacent screw members in opposite directions, a holder for carrying a roll of ribbon to be wound around the mass, means for rotating said holder and roll of ribbon around the mass, whereby the ribbon is helically wound around the mass, means to feed the bound mass into the zone of action of a cutting mechanism, and means to transversely cut the wound mass into discs of substantially uniform size.

11. An apparatus for continuously making steaks comprising in combination successively and cooperatively arranged means to form a plurality of pieces of flesh in a substantially compact mass and simultaneously feed the mass in position for binding, a holder for carrying a roll of ribbon to be wound around the mass, means to guide the ribbon around the mass, means for effecting relative movement between the mass and roll of ribbon, whereby the ribbon is helically wound around the mass, means to feed the bound mass into the zone of action of a cutting mechanism, and means to transversely cut the helically wound mass into discs of substantially uniform size.

12. An apparatus for continuously making steaks comprising in combination successively and cooperatively arranged means to form a plurality of pieces of flesh in a substantially compact mass and simultaneously feed the mass in position for binding, a holder for carrying a roll of ribbon to be wound around the mass, means to guide the ribbon around the mass, means for rotating said holder and roll of ribbon around the mass, whereby the ribbon is helically wound around the mass, means to feed the bound mass into the zone of action of a cutting mechanism, and means to transversely cut the helically wound mass into discs of substantially uniform size.

13. An apparatus for continuously making steaks comprising in combination a plurality of screw members arranged to define a trough and form a plurality of pieces of flesh into a substantially compact mass and simultaneously feed the mass in position for binding, a holder for carrying a roll of ribbon to be wound around the mass, means to guide the ribbon around the mass, means for rotating said holder and roll of ribbon around the mass, whereby the ribbon is helically wound around the mass, means to feed the bound mass into the zone of action of a cutting mechanism, and means to transversely cut the wound mass into discs of substantially uniform size.

14. An apparatus for continuously making steaks comprising in combination a plurality of screw members arranged to define a trough and form a plurality of pieces of flesh into a substantially compact mass and simultaneously feed the mass in position for binding, the adjacent screw members having oppositely directed threads, means to rotate the adjacent screw members in opposite directions, a holder for carrying a roll of ribbon to be wound around the mass, means to guide the ribbon around the mass, means for rotating said holder and roll of ribbon around the mass whereby the ribbon is helically wound around the moss, means to feed the bound mass into the zone of action of a cutting mechanism, and means to transversely cut the wound mass into discs of substantially uniform size.

15. An apparatus for continuously making steaks comprising in combination means to form a plurality of pieces of flesh in a substantially compact mass and simultaneously feed the mass in position for binding, a holder for carrying a roll of ribbon to be wound around the mass, a sleeve through which the mass passes provided with a slot through which the ribbon is guided onto said mass, means for effecting relative movement between the mass and roll of ribbon, whereby the ribbon is helically wound around the mass, means to feed the bound mass into the zone of action of a cutting mechanism, and means to transversely cut the helically wound mass into discs of substantially uniform size.

16. An apparatus for continuously making steaks comprising in combination means to form a plurality of pieces of flesh in a substantially compact mass and simultaneously feed the mass in position for binding, a holder for carrying a roll of ribbon to be wound around the mass, a sleeve through which the mass passes provided with a slot through which the ribbon is guided onto said mass, means for rotating said holder and roll of ribbon around the mass, whereby the ribbon is helically wound around the mass, means to feed the bound mass into the zone of action of a cutting mechanism, and means to transversely cut the helically wound mass into discs of substantially uniform size.

17. An apparatus for continuously making steaks comprising in combination a plurality of screw members arranged to define a trough and form a plurality of pieces of flesh into a substantially compact mass and simultaneously feed the mass in position for binding, a holder for carrying a roll of ribbon to be wound around the mass, a sleeve through which the mass passes provided with a slot through which the ribbon is guided onto said mass, means for rotating said holder and roll of ribbon around the mass, whereby the ribbon is helically wound around the mass, means to feed the bound mass into the zone of action of a cutting mechanism, and means to transversely cut the wound mass into discs of substantially uniform size.

18. An apparatus for continuously making steaks comprising in combination a plurality of screw members arranged to define a trough and form a plurality of pieces of flesh into a substantially compact mass and simultaneously feed the mass in position for binding, the adjacent screw members having oppositely directed threads, means to rotate the adjacent screw members in opposite directions, a holder for carrying a roll of ribbon to be wound around the mass, a sleeve through which the mass passes provided with a slot through which the ribbon is guided onto said mass, means for rotating said holder and roll of ribbon around the mass, whereby the ribbon is helically wound around the mass, means to feed the bound mass into the zone of operation of a cutting mechanism, and means to transversely cut the wound mass into discs of substantially uniform size.

HARDEN F. TAYLOR.